(12) United States Patent
Bourhill

(10) Patent No.: US 9,663,123 B2
(45) Date of Patent: May 30, 2017

(54) SPRING CAGING MECHANISM FOR A COIL SPRING RAIL BRAKE

(75) Inventor: Ian W. Bourhill, Delta (CA)

(73) Assignee: Hillmar Industries Limited, Delta (CA)

( * ) Notice: Subject to any disclaimer, the term of this patent is extended or adjusted under 35 U.S.C. 154(b) by 406 days.

(21) Appl. No.: 14/123,189

(22) PCT Filed: May 30, 2011

(86) PCT No.: PCT/CA2011/000642
§ 371 (c)(1),
(2), (4) Date: Jan. 16, 2014

(87) PCT Pub. No.: WO2012/162783
PCT Pub. Date: Dec. 6, 2012

(65) Prior Publication Data
US 2015/0175177 A1    Jun. 25, 2015

(51) Int. Cl.
*B61H 13/00* (2006.01)
*B61H 7/04* (2006.01)
(Continued)

(52) U.S. Cl.
CPC .............. *B61H 13/005* (2013.01); *B60T 1/00* (2013.01); *B61H 7/04* (2013.01); *F16D 63/008* (2013.01)

(58) Field of Classification Search
CPC .............. F16D 63/008; F16D 2127/06; F16D 2125/58; F16D 71/04; B61H 7/00;
(Continued)

(56) References Cited

U.S. PATENT DOCUMENTS

| 581,270 A | 4/1897 | Davis |
|---|---|---|
| 1,790,202 A | 1/1931 | Down |

(Continued)

FOREIGN PATENT DOCUMENTS

WO    WO-2011063492 A1 *  6/2011

OTHER PUBLICATIONS

WIPO, International Searching Authority, International Search Report mailed Feb. 3, 2012, in International Patent Application No. PCT/CA2011/000642, 3 pages.
(Continued)

*Primary Examiner* — Melody Burch
(74) *Attorney, Agent, or Firm* — Cameron IP

(57) ABSTRACT

A rail brake includes a rigid enclosure which mounts under a crane so as to dispose the base end of the enclosure over and adjacent a rail. A spring carriage is mounted for vertical translation within the enclosure. Springs are mounted between the spring carriage and the top of the enclosure so that the springs are compressed when the spring carriage is elevated. A brake shoe is mounted under the carriage. Actuators are mounted between the spring carriage and the base end of the enclosure. Extension of the actuators compress the springs and elevate the brake shoe from the rail. Retraction allows the springs to drive the brake shoe against the rail. Elevation of the brake shoe aligns a pair of spline joints between the sides of the brake shoe and corresponding channel walls underneath the enclosure. Removable elongate keys provide the locking splines in the pair of spline joints.

8 Claims, 19 Drawing Sheets

(51) Int. Cl.
*F16D 63/00* (2006.01)
*B60T 1/00* (2006.01)

(58) Field of Classification Search
CPC .......... B61H 7/02; B61H 7/04; B61H 13/005; B60T 1/00
USPC .................. 188/33, 34, 41, 42, 43, 44, 165; 104/249, 257, 258, 261
See application file for complete search history.

(56) References Cited

U.S. PATENT DOCUMENTS

| | | | |
|---|---|---|---|
| 2,748,895 A * | 6/1956 | Lucchetti | B61H 7/02 188/36 |
| 3,878,925 A | 4/1975 | Ignatoweicz | |
| 3,972,392 A | 8/1976 | Johnson | |
| 5,188,038 A * | 2/1993 | Shanley | B60T 7/124 104/242 |
| 7,975,811 B2 * | 7/2011 | Berliant | B61H 7/12 188/41 |
| 2009/0294223 A1* | 12/2009 | Hesl | F16D 63/008 188/42 |

OTHER PUBLICATIONS

WIPO, International Searching Authority, Written Opinion of the International Searching Authority mailed Feb. 3, 2012, in International Patent Application No. PCT/CA2011/000642, 4 pages.

\* cited by examiner

SPRING CAGING MECHANISM FOR A COIL SPRING RAIL BRAKE

FIELD OF THE INVENTION

This invention relates to the field of rail brakes and in particular to an improved spring caging mechanism for a coil spring rail brake which provides, among other things, for improved access for caging the spring assembly.

BACKGROUND OF THE INVENTION

In the prior art, applicant is aware of various designs of rail brakes. In particular, applicant is aware of the following United States Patents:

U.S. Pat. No. 581,270 which issued Apr. 27, 1897, to Davis for a Rail Brake discloses the use of coil springs secured to lever bars so as to hold the lever bars, and the brake shoes mounted thereunder, away from the track rails.

U.S. Pat. No. 1,790,202 which issued to Down on Jan. 27, 1931, for a Magnetic Brake Device, discloses a magnetic brake shoe which is normally held suspended away from the rail and, upon energization, is attracted to the rail to act as a brake. A coil spring is disposed in a chamber and acts on a piston so as to normally maintain the brake shoe in a suspended position over the rail.

U.S. Pat. No. 3,878,925 which issued to Ignatoweicz in Apr. 22, 1975, for a Mounting Device for Magnetic Rail Brakes, discloses reducing the air pressure in conventional bellows so as to compress the bellows downwardly until stopped by a spring buffer at a low position wherein the brake magnet may be energized so as to be attracted towards the rail thereby causing a further compression of the spring buffer. Correction of the vertical setting of the magnetic brake unit is accomplished by pressurizing the bellows so as to raise the magnetic unit to a high position. The height of the magnetic unit above the rail may then be adjusted.

SUMMARY OF THE INVENTION

A rail brake includes a rigid enclosure having an upper end and opposite base end rigidly mounted oppositely to the upper end. The upper end is adapted for mounting to the rail-mounted machine, for example under a crane, so as to dispose the base end of the enclosure over and adjacent the rail.

In one embodiment of the rail brake, a top plate is mounted underneath the upper end of the enclosure, spaced apart from and substantially parallel to the upper end of the enclosure so as to define a gap there-between. In the present embodiment such a top plate is optional, and in embodiments where a top plate is not employed, the springs, better described below, may press up against the upper end of the enclosure, and in what is described below it is intended that the description below is to be amended accordingly.

A spring carriage is mounted for vertical translation within the enclosure, beneath the top plate or upper end of the enclosure, between an elevated position and a lowered position. At least one spring is mounted on the spring carriage so that the springs are compressed when the spring carriage is in its elevated position and decompressed when the spring carriage is in its lowered position. At least one brake shoe is mounted under the spring carriage so as to be oppositely disposed on the carriage relative to the springs. The springs, acting against the top plate or upper end of the enclosure, drive the brake shoe downwardly into contact with the rail.

At least one selectively actuable actuator is mounted between, so as to bear opposite ends thereof against, the spring carriage and the base end of the enclosure respectively. The actuators are actuable between extended and retracted positions. In the extended position, the spring carriage is in its elevated position and the brake shoes are correspondingly retracted upwardly from contact with the rail. In the retracted position, the spring carriage is in its lowered position and the brake shoes are correspondingly lowered and urged by the springs into frictional engagement against the rail.

The enclosure includes sides extending between the upper end and the base end.

In an earlier embodiment, which is not the subject of the present invention, the spring carriage may also include an elongate caging member, where the caging member has opposite first and second ends. The caging member is mounted to the spring carriage at the first end of the member and extends substantially parallel to the springs. The second end of the member is journalled upwardly through an aperture in the top plate, and is free to translate vertically in the gap as the spring carriage translates correspondingly within the enclosure so as to translate simultaneously and correspondingly therewith. The second end of the caging member protrudes into a spring-caging position in the gap when the spring carriage is in its elevated position. In the present invention a caging frame extends downwardly from the bottom end of the enclosure. The caging frame provides a parallel, spaced apart pair of walls depending downwardly from the enclosure so as to define a brake shoe channel therebetween. The brake shoe channel is aligned so as to be perpendicular to the rail, and positioned so as to align the brake shoe centrally over the rail. The brake shoe is mounted to a shoe rod or other supporting structure which in turn is mounted to the bottom of the spring carriage. The brake shoe is positioned in the brake shoe channel between the parallel pair of walls of the caging frame. The brake shoe fits snugly in the channel while remaining free to translate vertically.

A pair of opposed-facing substantially horizontal grooves are formed in and along the interior sides of the pair of walls defining the brake shoe channel. A corresponding oppositely disposed pair of grooves are formed in the sides of the brake shoe. When the brake shoe is in its raised position raised above the rail, the grooves on the sides of the brake shoe align with the grooves in the channel walls. With the grooves thus aligned, elongate keys, which are sized to snugly fit into the aligned grooves in the manner of a spline joint (where the elongate key is the spline), are slid into and along the length of the joint key-receiving bore formed by the aligned grooves. At least one key is employed to lock the brake shoe in its raised position, although preferably two such keys are used, one on either side of the brake shoe, so as to cage the spring or springs in the rail brake housing.

In a preferred embodiment the spring carriage also includes bearing members corresponding to the location of the tops of the actuators so that the actuators bear against the bearing members. The bearing members may include a pair of substantially oppositely disposed bearing members extending orthogonally relative to the actuators. The actuators may be corresponding pair of actuators extending substantially parallel to the springs.

The carriage translates a brake set distance between the elevated and lowered positions, and the actuators actuate a corresponding actuation distance between their extended and retracted positions. The actuators also selectively elevate the spring carriage to an unlocking position which is further elevated above the carriage's elevated position so as to unload a spring force load applied to the keys when mounted in the joint bores formed by the aligned grooves. Once the spring force is unloaded the each key is removable from its corresponding pair of aligned grooves.

The keys may be a pair of separate rods, or may be formed as a double-tined fork.

As claimed herein, the spring caging mechanism for a rail brake according to the present disclosure, wherein the rail brake includes a rail brake enclosure housing at least one spring acting downwardly against a brake shoe mounted underneath the rail brake enclosure so as to urge the brake shoe against a rail when the rail brake is positioned over the rail, may be characterized in one aspect as including a caging frame mounted to and depending downwardly from the rail brake enclosure so as to bracket a brake shoe which is mounted under the enclosure and linked to the spring or springs in the enclosure, wherein the caging frame includes a pair of substantially parallel walls defining a brake shoe channel therebetween, wherein the channel is sized so that the brake shoe is suspended snugly in the channel for vertical translation of the brake shoe in the channel between raised and lowered positions corresponding to a spring caging position and a rail engaging position respectively. Opposed facing inner walls of the channel walls include a corresponding pair of opposed facing first grooves. An oppositely disposed pair of second grooves are formed in oppositely disposed outer surfaces of the brake shoe. The second grooves are positioned so that, when the brake shoe is in its raised position, the first and second grooves are adjacent and aligned so as to form, collectively, a pair of key-receiving bores on opposite sides of the brake shoe when in its raised position. A pair of elongate keys are sized for snug sliding fitment into and along the pair of key-receiving bores. When the keys are journalled in the bores the brake shoe is releasably locked in its raised position thereby caging the rail brake spring or springs in the rail brake enclosure.

In one embodiment the pair of key-receiving bores and the first and second grooves are substantially horizontal. Advantageously the pair of first grooves and the pair of second grooves are each aligned in a corresponding substantially horizontal plane defined parallel to the top of the rail. In the illustrated embodiment, which is not intended to be limiting, the first and second grooves are formed as correspondingly-shaped channels so that the key receiving bores have a substantially square cross-section. Further advantageously the brake shoe channel is aligned so as to be substantially perpendicular to the rail when the rail brake is positioned over the rail.

The caging frame may further comprise oppositely disposed reinforcing members abutting and extending away from the parallel walls. For example the reinforcing members may include at least one pair of oppositely disposed flanges mounted to so as to extend between the walls and the base of the rail brake enclosure or housing.

BRIEF DESCRIPTION OF THE DRAWINGS

In the drawings forming part of this specification, like reference numerals denote corresponding parts in each view, and wherein:

FIG. 1b is, in front elevation view, the rail brake of FIG. 1a.

FIG. 1c is, in plan view, the rail brake of FIG. 1a.

FIG. 2b is, in front elevation view, the rail brake of FIG. 2a.

FIG. 2c is, in plan view, the rail brake of FIG. 2a.

FIG. 8a is, in top perspective partially exploded view, the rail brake of FIG. 6 showing the spring, spring carrier, and brake shoe rod removed from the enclosure housing, and showing the brake shoe locking keys removed from the caging frame under the housing.

FIG. 8b is in bottom perspective, the view of FIG. 8a.

FIG. 9 is a sectional view along line 9-9 in FIG. 3a.

DETAILED DESCRIPTION OF EMBODIMENTS OF THE INVENTION

Figure 1A:
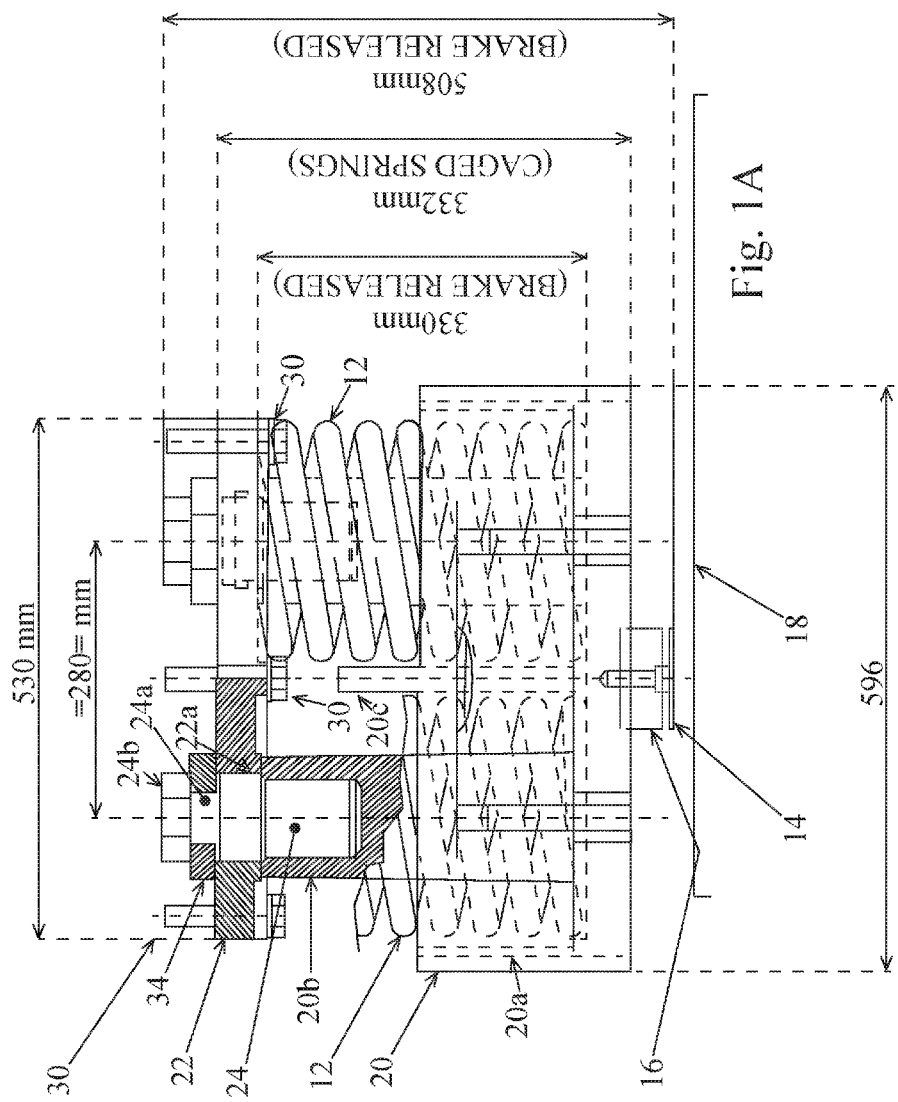
FIG. 1a is, in partially cut-away side elevation view, one embodiment of a coil spring rail brake.
Figure 1B:
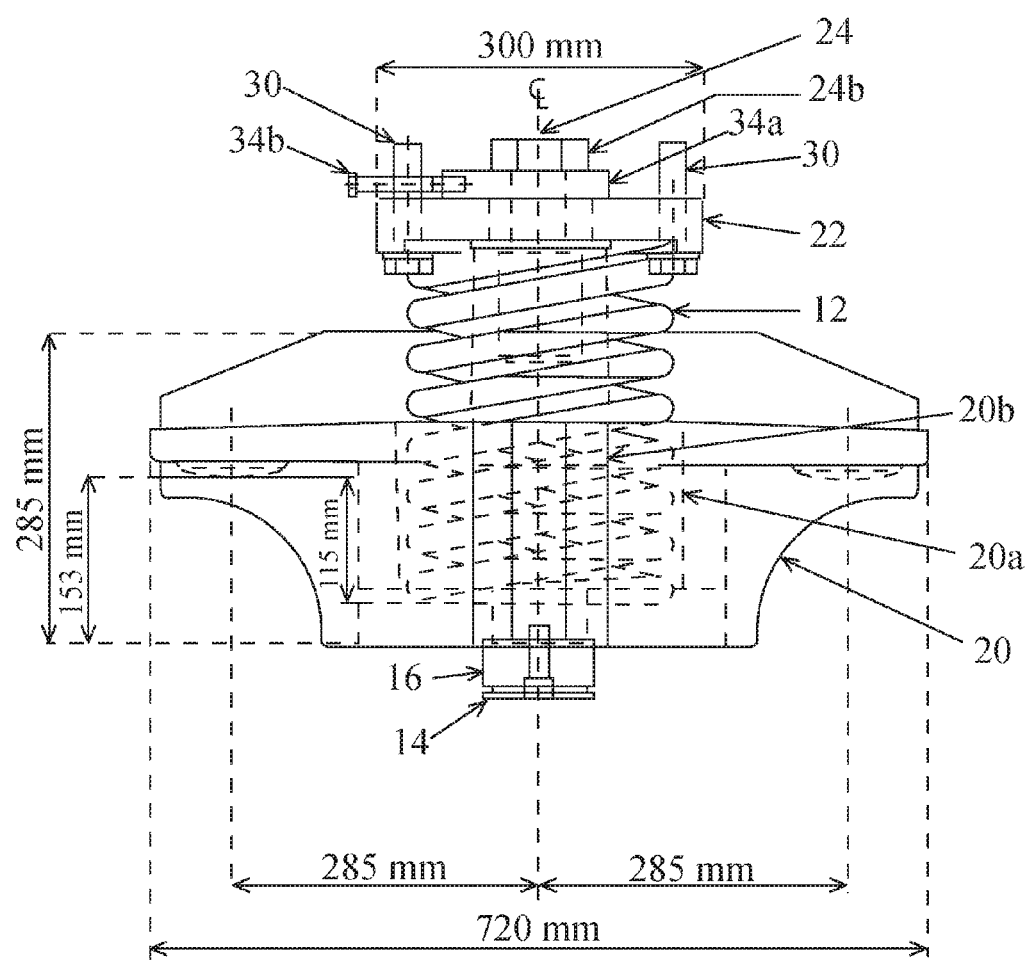
Figure 1C:
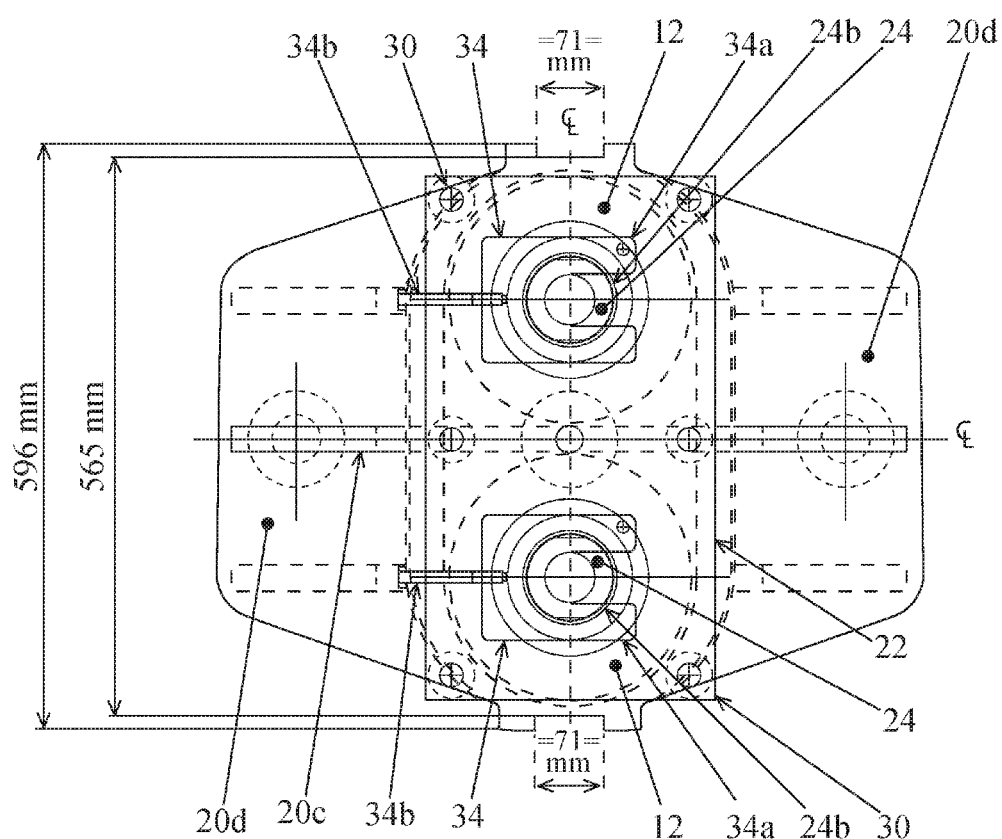
Figure 2A:
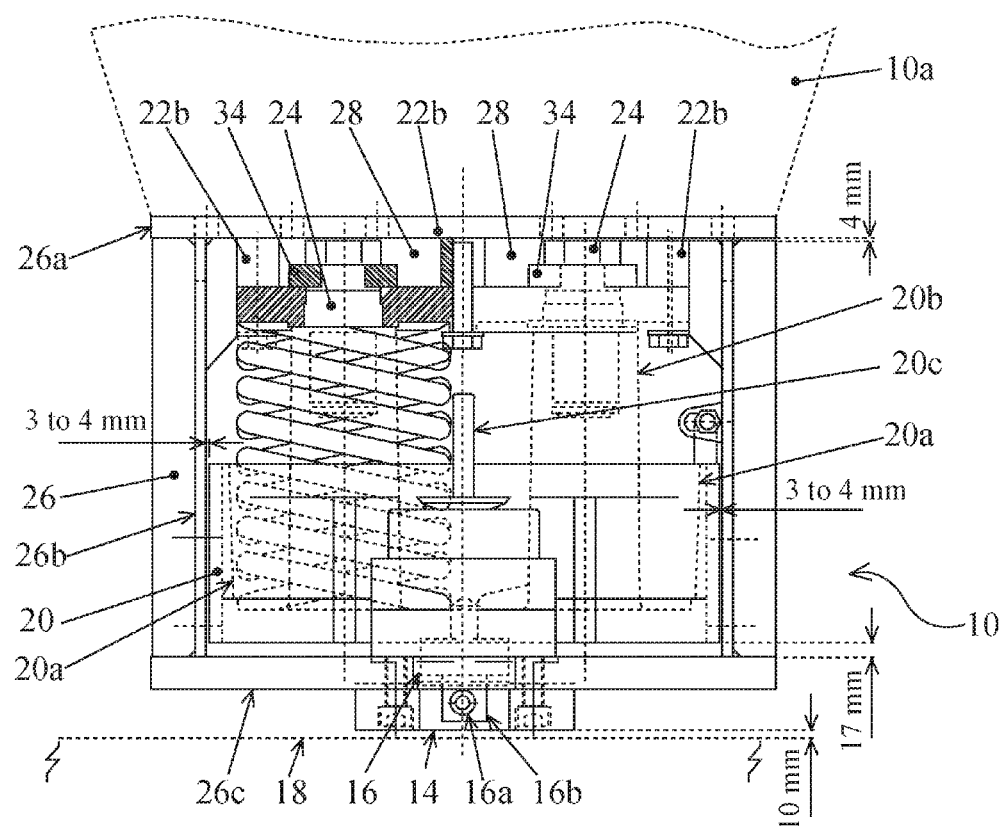
FIG. 2a is, in partially cut-away side elevation view, the rail brake of FIG. 1a with the pair of helical coil springs removed and showing the rail brake housing.
Figure 2B:
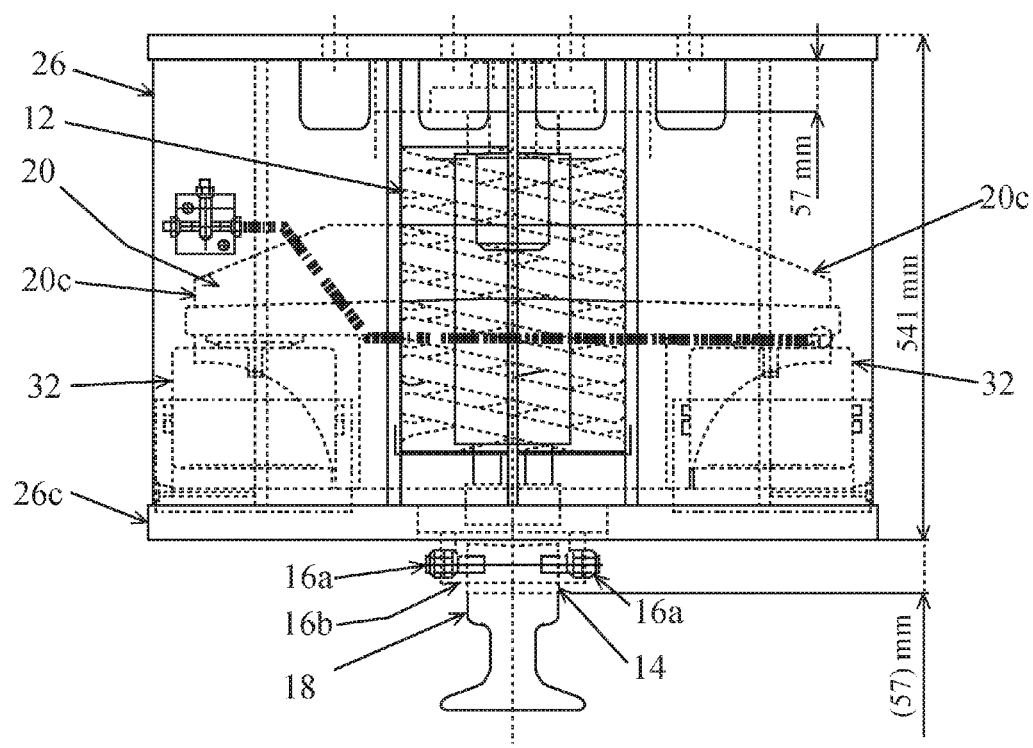
Figure 2C:
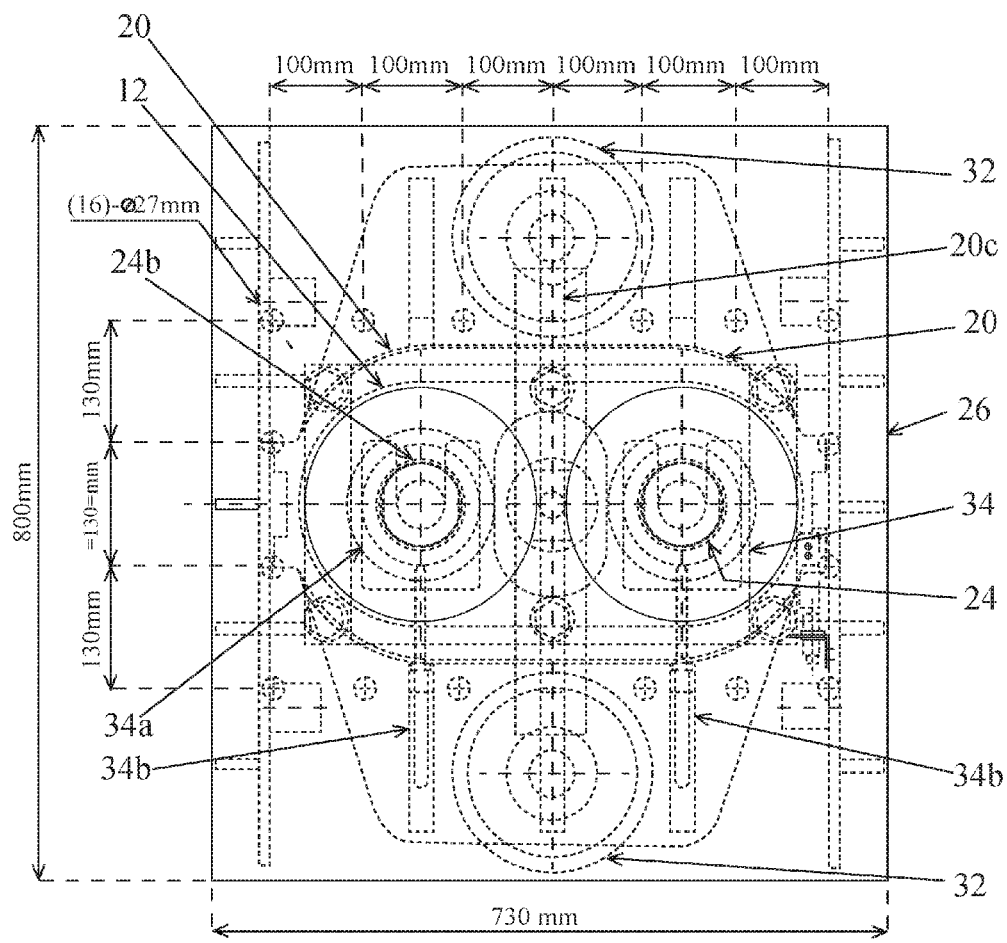
Figure 3:
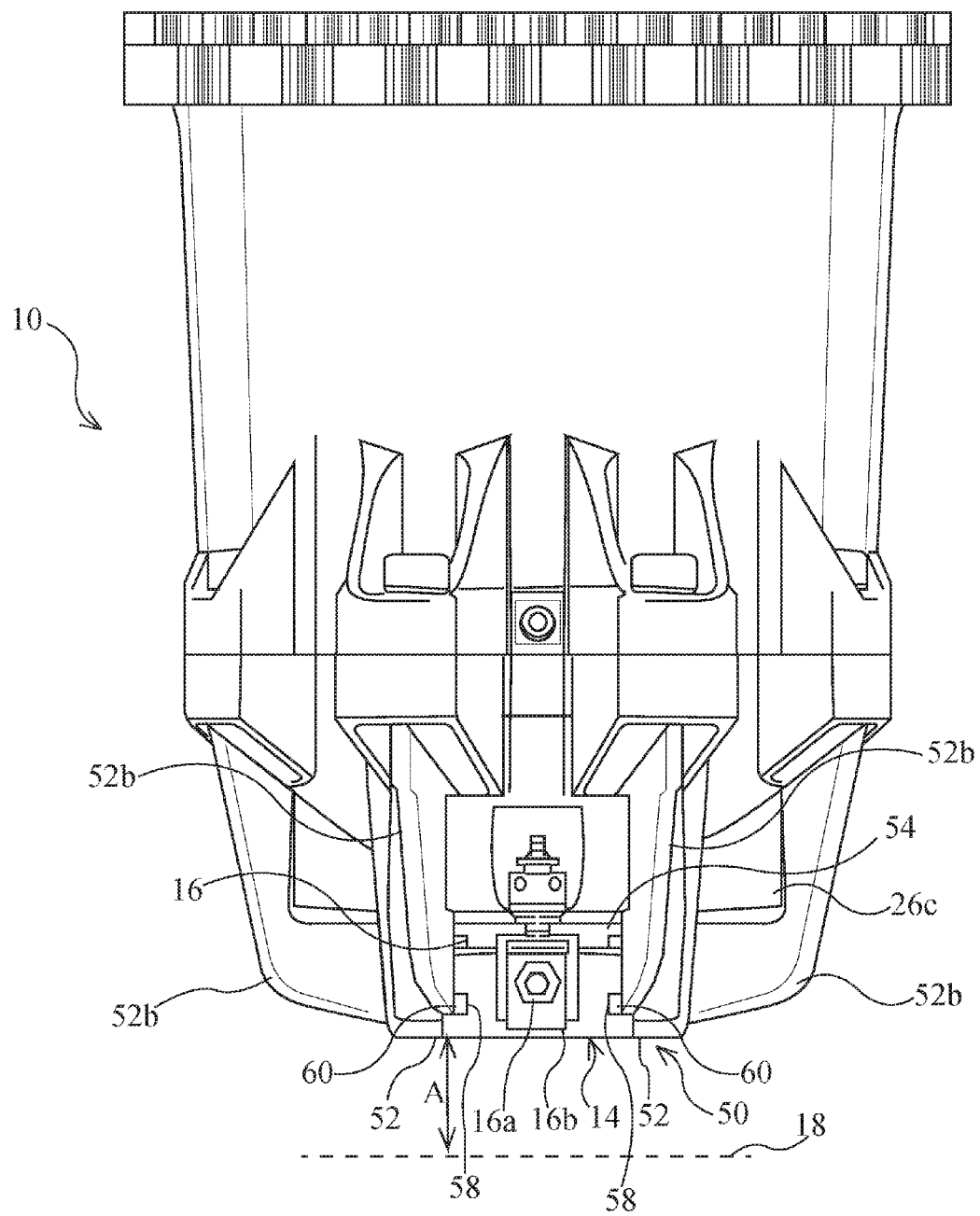
FIG. 3 is, in a first side elevation, a rail brake according to a further embodiment, with the brake shoe elevated and locked in its raised position so as to cage the rail brake springs.
Figure 3A:
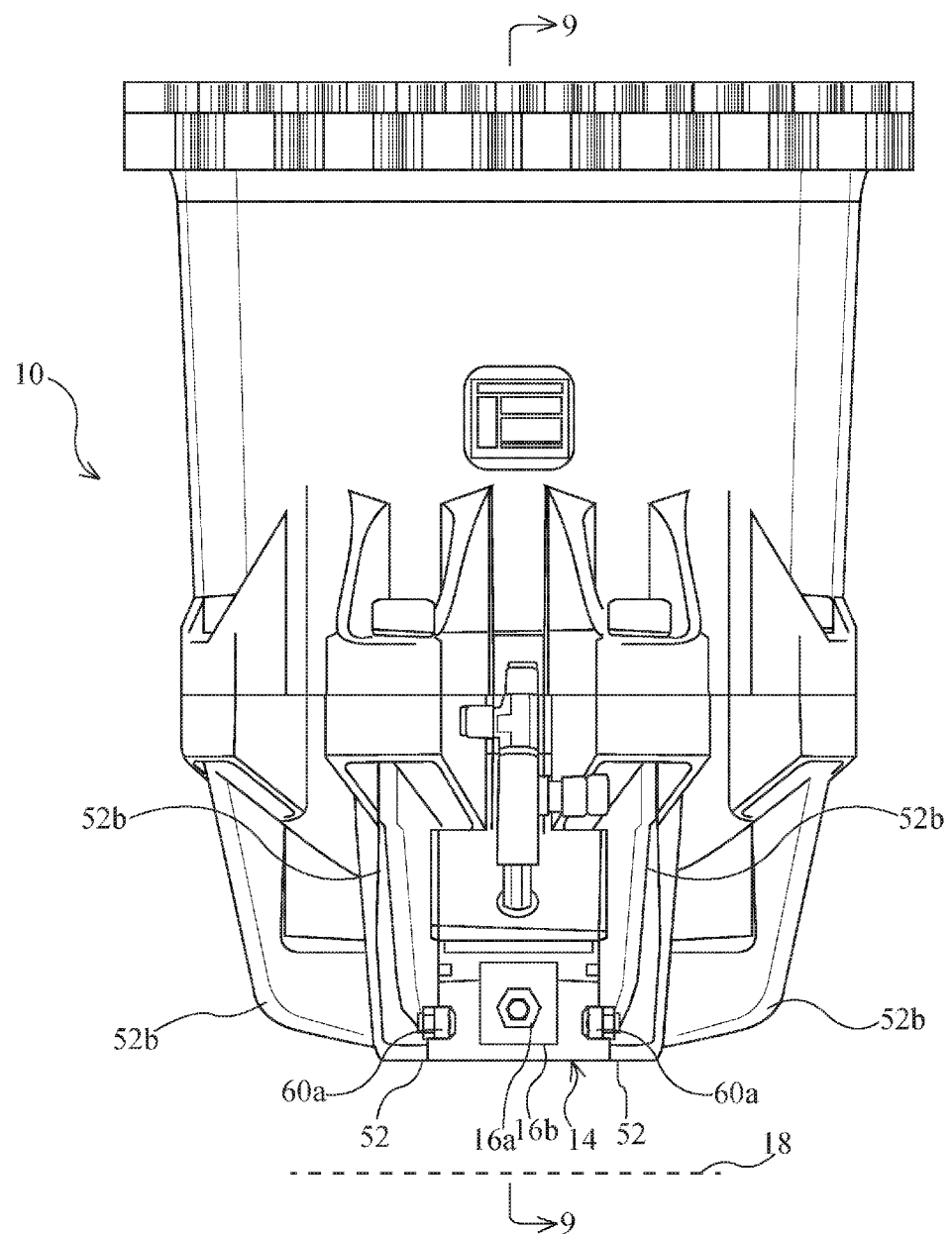
FIG. 3a is a second side elevation view opposite to that of FIG. 3.
Figure 3B:
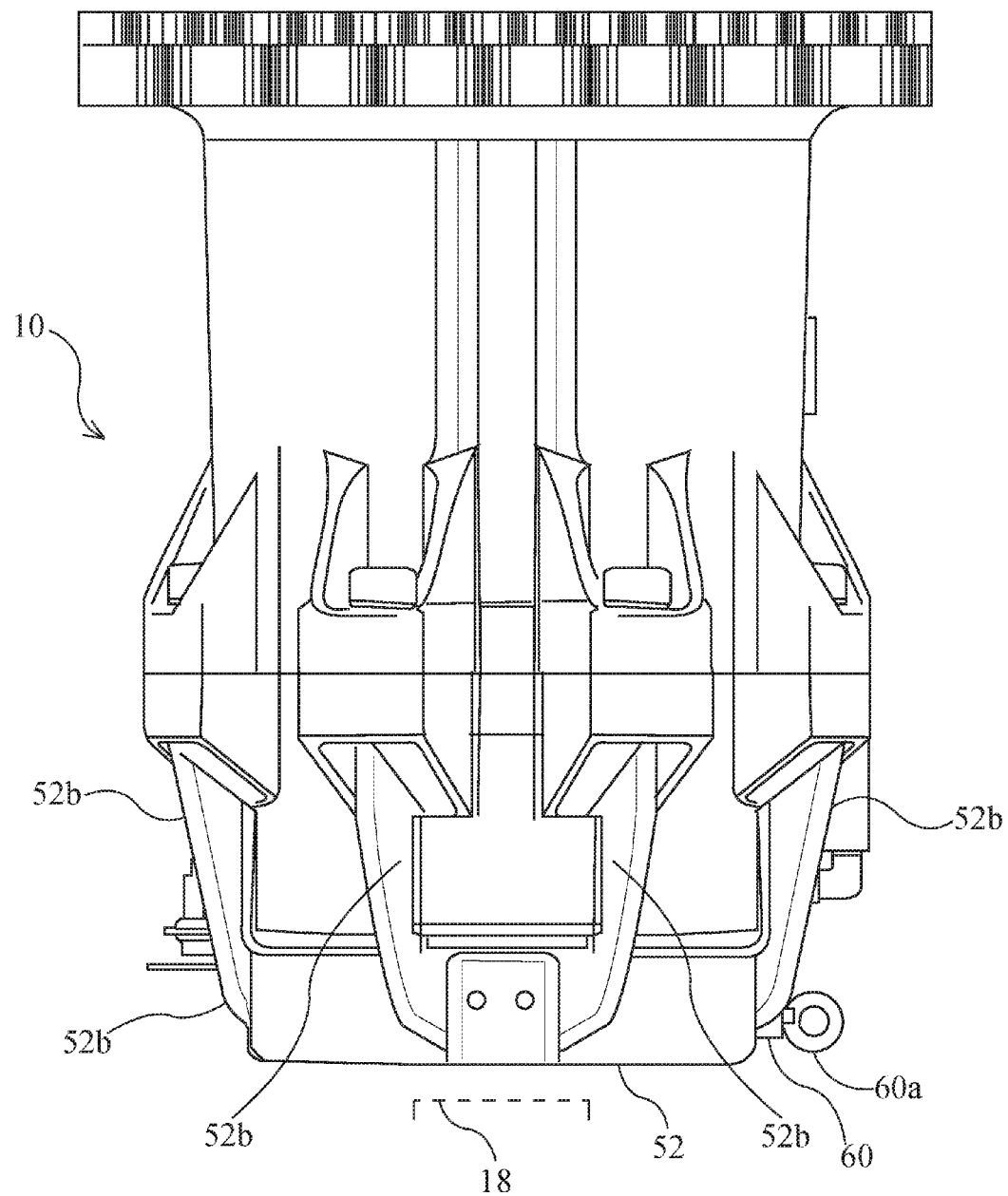
FIG. 3b is, in front elevation view, the rail brake of FIG. 3.
Figure 4:
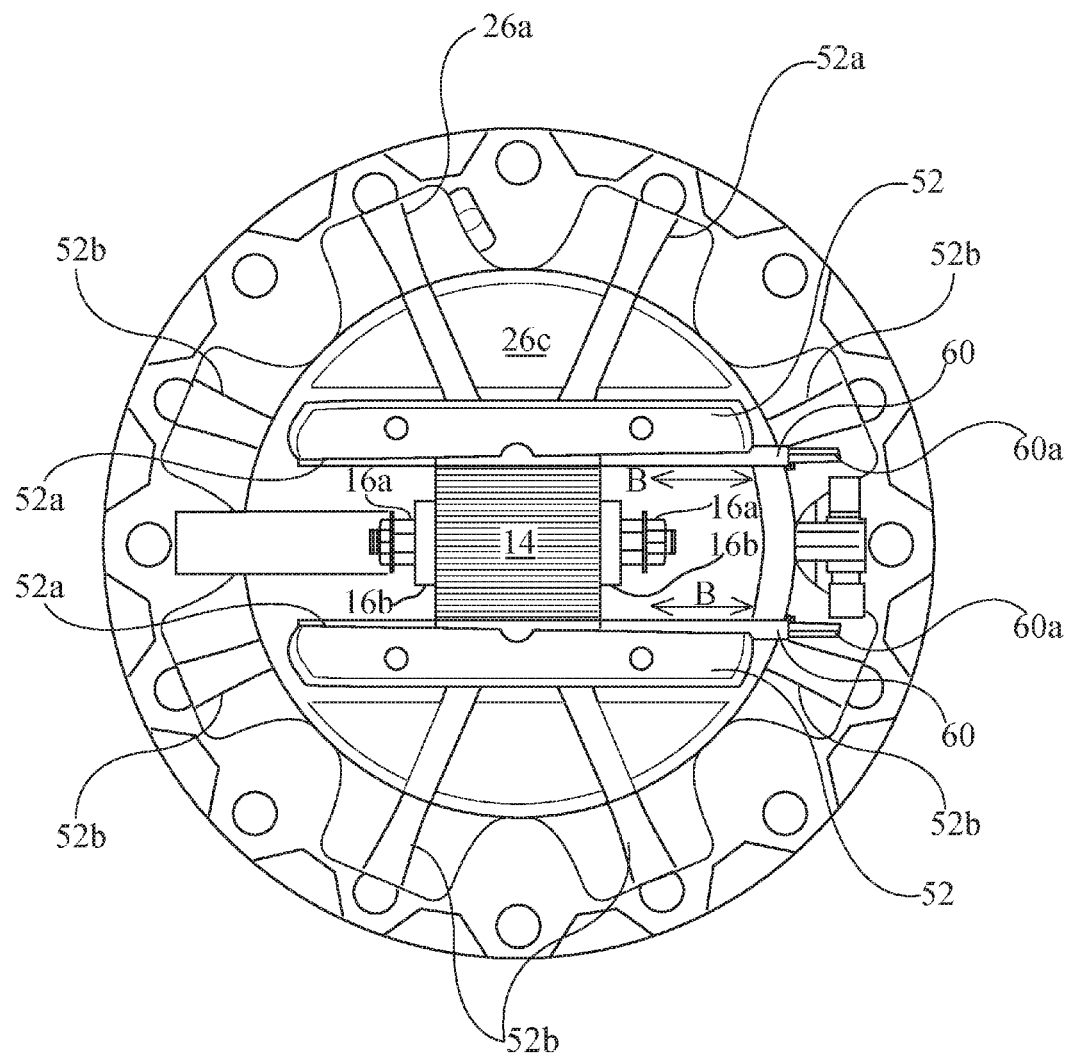
FIG. 4 is, in bottom view, the rail brake of FIG. 3.
Figure 4A:
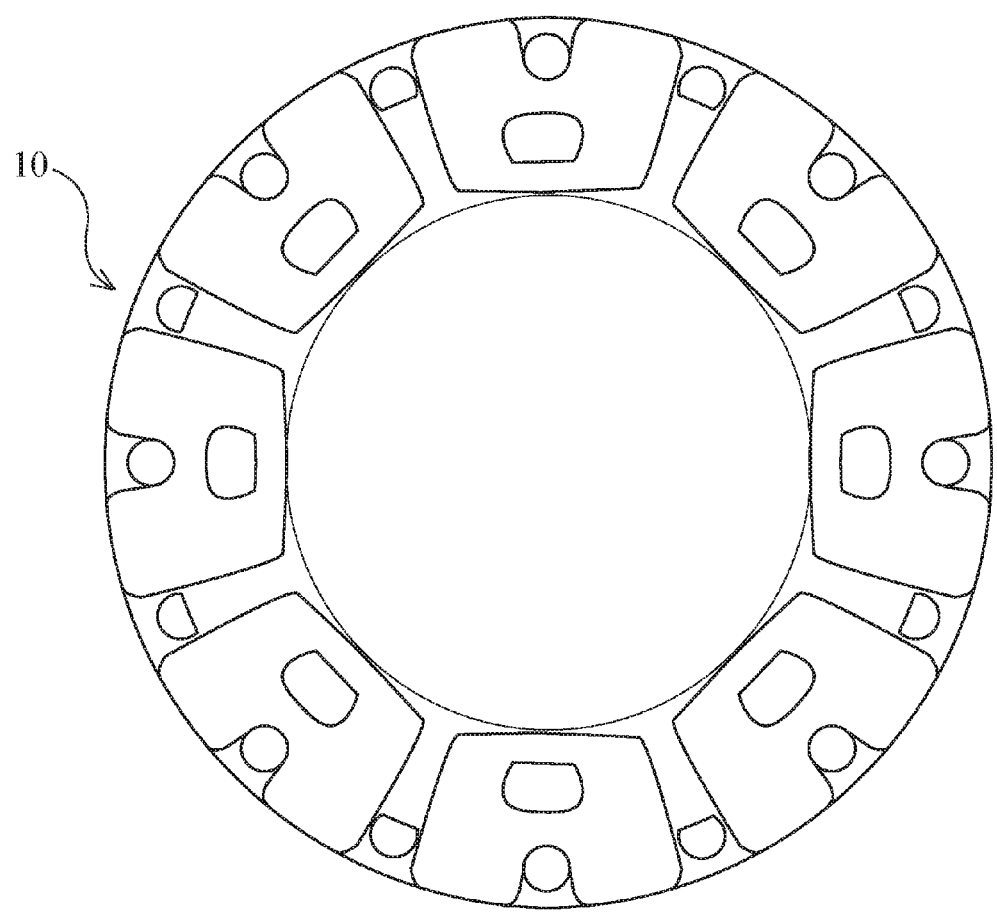
FIG. 4a is, in top view, the rail brake of FIG. 3.
Figure 5:
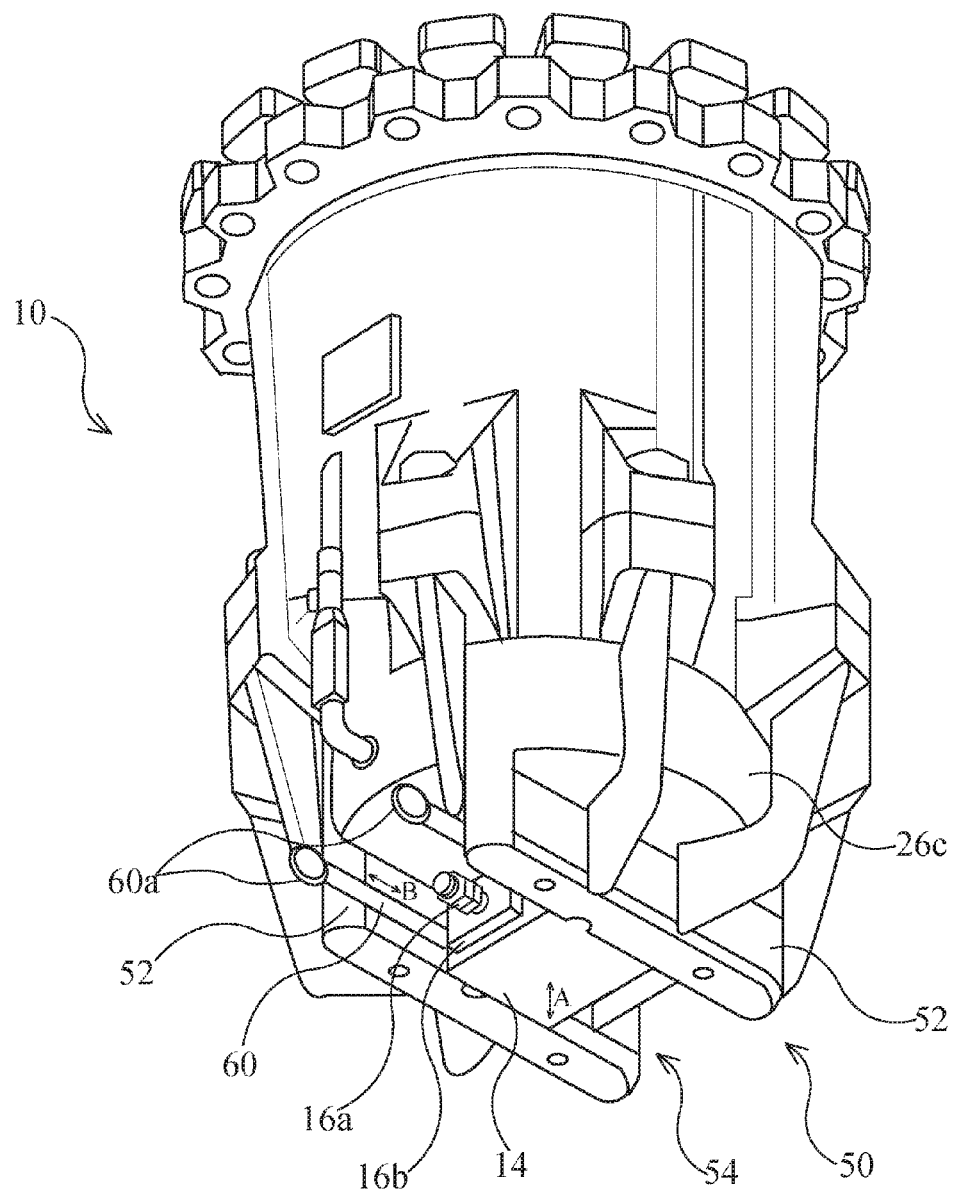
FIG. 5 is a bottom, rear, second side, perspective view of the rail brake of FIG. 3.
Figure 5A:
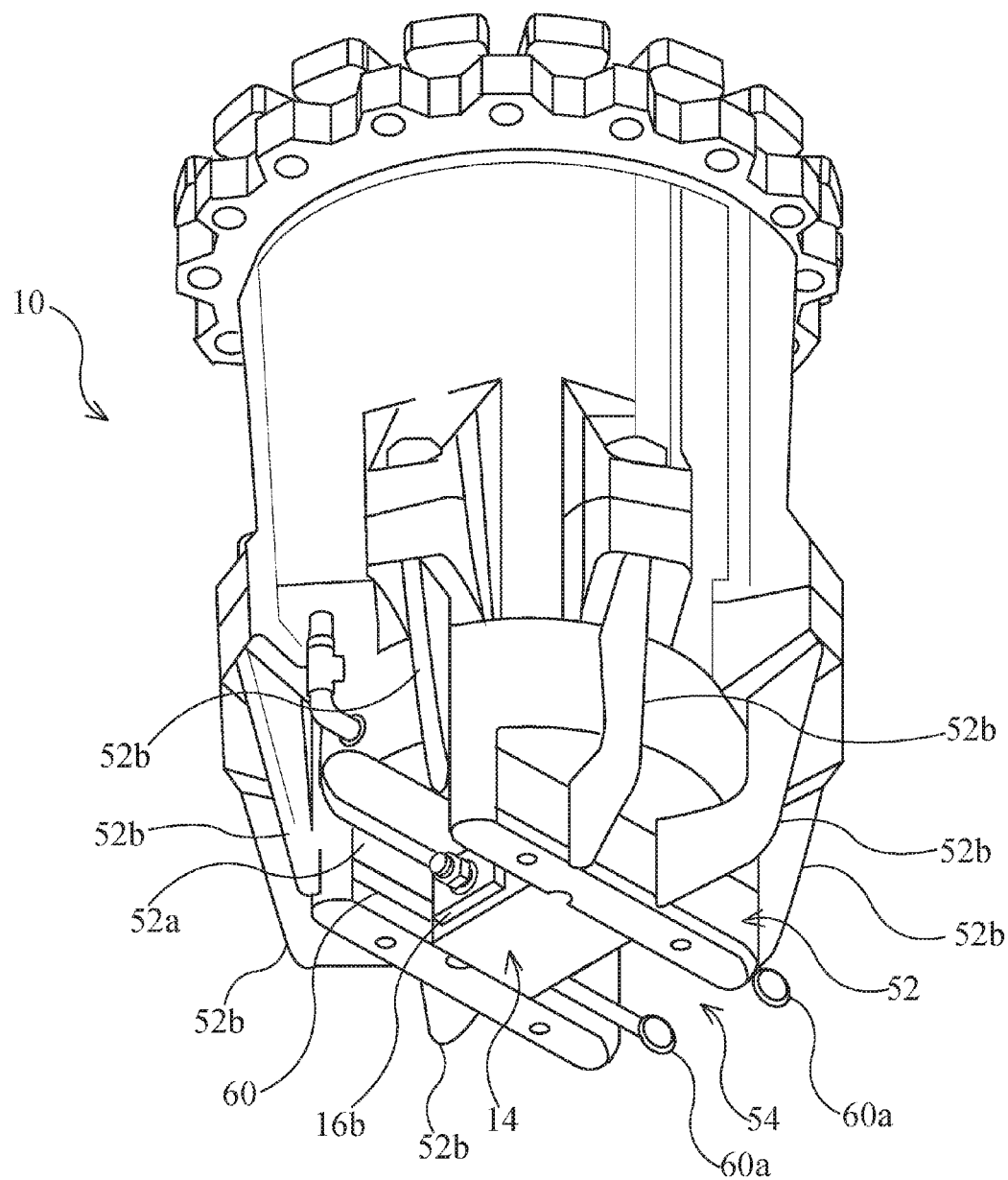
FIG. 5a is a bottom, front first side, perspective view of the rail brake of FIG. 3.
Figure 6:
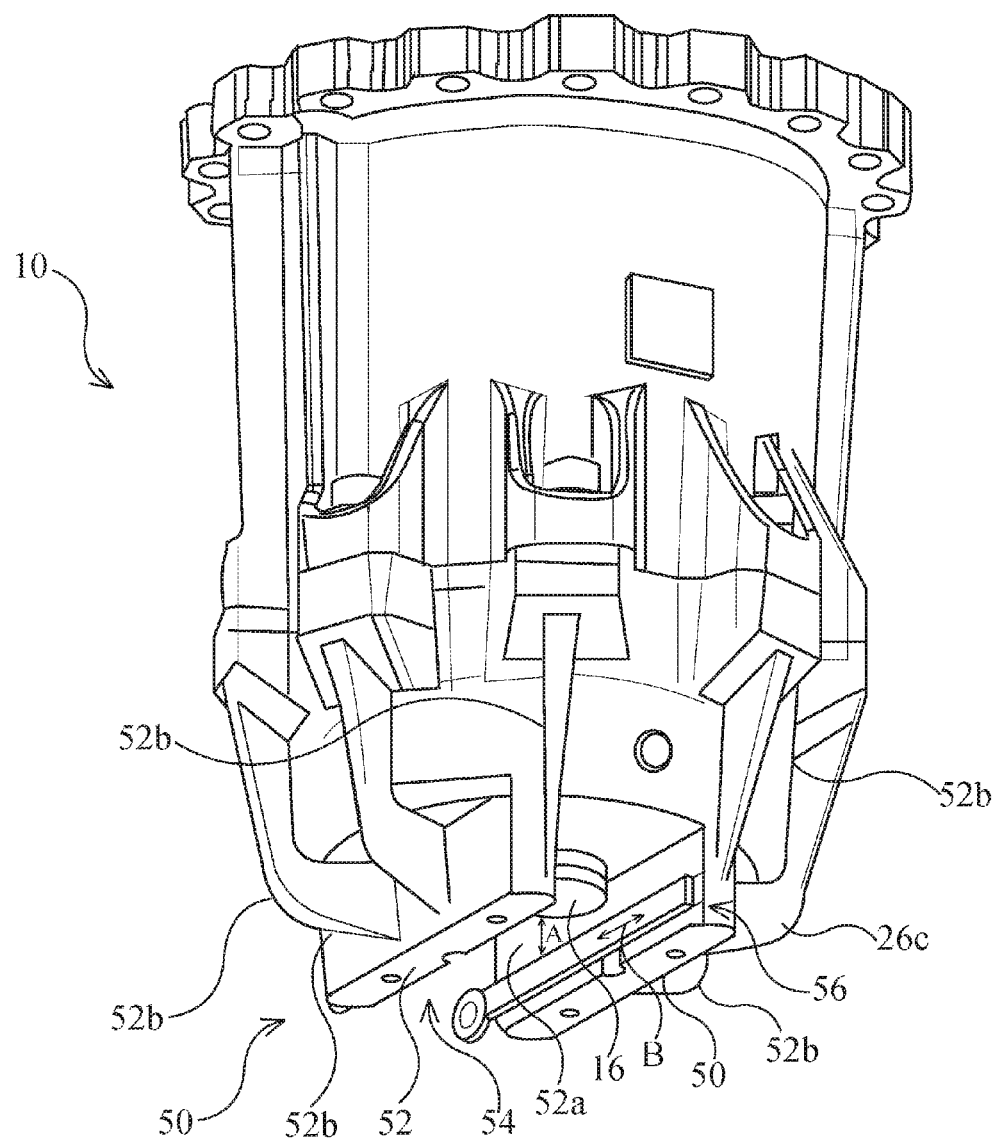
FIG. 6 is a bottom, rear, second side perspective view of the rail brake of FIG. 3, with brake shoe removed.
Figure 6A:
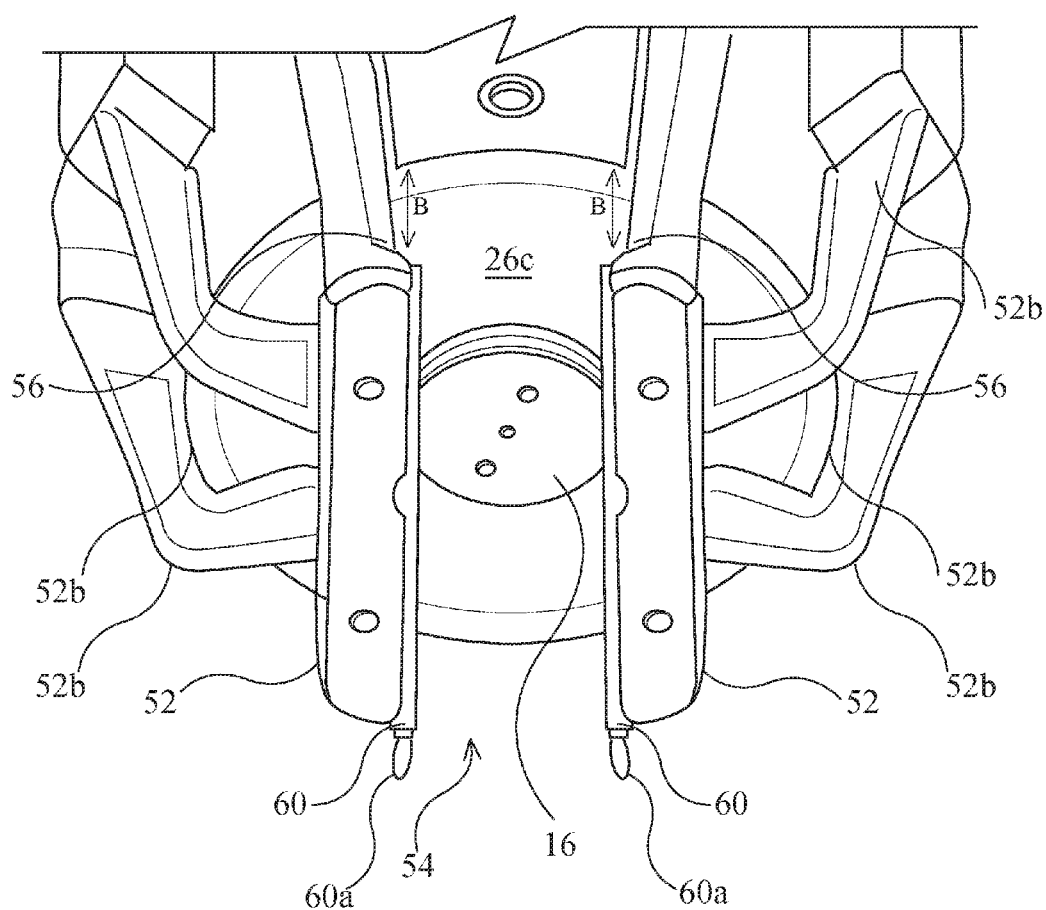
FIG. 6a is bottom, side perspective view of the rail brake of FIG. 6.
Figure 6B:
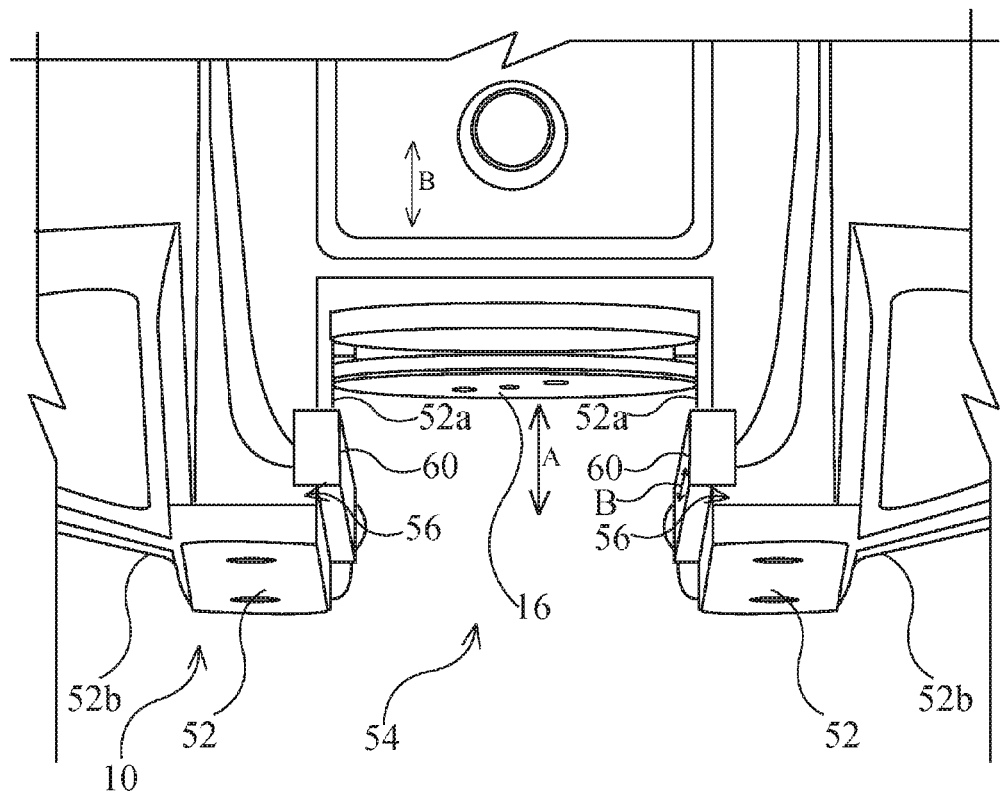
FIG. 6b is a side elevation of the rail brake of FIG. 6.
Figure 7:
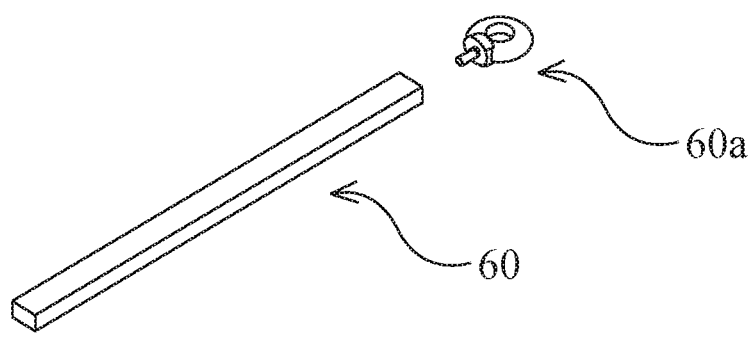
FIG. 7 is a perspective view of one brake shoe locking key.

The rail brake 10 shown in the Figures is mounted under a rail-mounted machine such as a crane 10a. There exists a space between the crane and the rails in which a rigid rail brake enclosure 26 is mounted. The top plate of the enclosure is bolted to the underside of the crane so as to position the bottom of the enclosure adjacent the rail to which the brake is to be applied. A modular spring and actuator mechanism is housed in the enclosure. The actuators may be a pair of actuators mounted in the enclosure to act on the spring mechanism. The spring mechanism may include a pair of helical coil springs 12 which in one embodiment exert a nominal 470 kilo-newton downward force driving downwardly one or more brake shoes 14 mounted under the spring mechanism. In particular, brake shoes 14 mounted on shoe rods 16 are driven downwardly into frictional engagement against the upper surface of rails 18. Rails 18 as seen for example in FIGS. 3, 3a and 3b are directly under the brake shoe 14 and aligned perpendicular to the brake shoe channel 54. Brake shoes 14 are mounted to shoe rods 16 by bolts 16a engaging through holes in metal clips 16b.

In the earlier embodiment of FIGS. 1a-2c, within the spring mechanism, coil springs 12 are maintained in spaced apart parallel alignment by rigid supports mounted to contain the tops and the bottoms of the springs and in particular by a spring holder 20 supporting the bottom of the springs and by a top plate assembly 22 supporting the tops of the springs. Spring holder 20 includes walls 20a formed to cup the bottoms of the springs 12 and vertically upstanding guides 20b which extend upwardly within the cavity defined by walls 20a so that, with springs 12 installed in spring holder 20, guides 20b extend upwardly journalled through the center of the helical coils of the springs. The top surfaces of guides 20b are adjacent the underside of top plate assembly 22 when the springs 12 are fully compressed as further described below. A center guide member 20c extends upwardly between the springs and acts as a stop against top plate assembly 22 to prevent over-compressing of the springs as over-compression of the springs may damage the springs. The top of center guide member 20c acts as a spacer in combination with the top plate to prevent this over-compression.

In the earlier embodiment of FIGS. 1a-2c, a caging pin 24 is rigidly mounted into the top ends of guides 20b so as to protrude vertically upwards therefrom. The shank 24a of pins 24 pass through corresponding apertures 22a formed in top plate assembly 22 so that as springs 12 are compressed or allowed to expand, caging pins 24 mounted in guides 20b are raised or lowered respectively relative top plate assembly 22. Springs 12 and the supports for the springs provided by a spring carriage such as spring holder 20 are all mounted within a rigid enclosure 26. Enclosure 26 is mounted to the underside of the rail-mounted machinery, such as the underside of crane 10a, in the space between the underside of the machine and the rail 18. Top plate assembly 22 is bolted to spacers 22b mounted underneath the upper plate 26a of enclosure 26. Enclosure 26 includes upper plate 26a, sidewalls or a supporting framework 26b (collectively referred to herein as walls), and a rigid base 26c supported rigidly underneath the upper plate 26a by the walls. The spring assembly consists of the pair of springs 12, the spring holder 20, and the top plate assembly 22, mounted within the enclosure 26.

In the earlier embodiment a cavity or space 28 is maintained between top plate assembly 22 and the upper plate 26a of enclosure 26 by spacers 22b. Space 28 allows for vertical translation of caging pins 24, that is, of the upper end of the caging members. With the top plate assembly 22 bolted to the upper plate 26a by bolts 30 through spacers 22b, the spring assembly is suspended within enclosure 26 so as to accommodate the compression and extension of springs 12.

Figure 8:
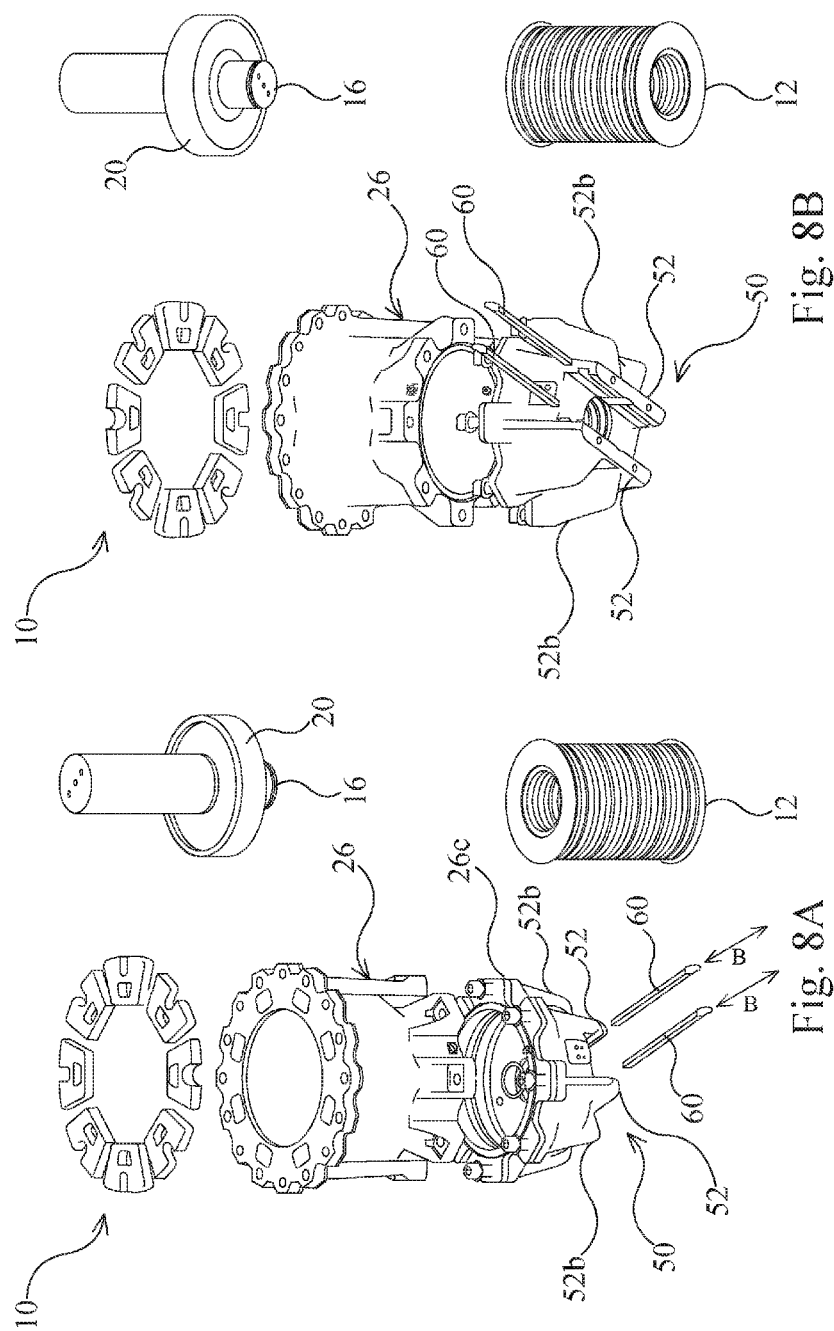

In the present embodiment of FIG. 3 onward, as springs 12' extend, spring holder 20 is pushed downwardly so as to bias brake shoe 14 downwardly into frictional engagement on rail 18. A pair of actuators 32, which may also be hydraulic actuator 32', are mounted or act between the base 26c of the enclosure and bearing members such as a cantilevered or otherwise formed rigid flange 20c for example extending annularly around spring holder 20 as seen in FIG. 8a. When actuated so as to extend the actuator 32' drives spring holder 20 upwardly. This compresses spring 12' towards its fully compressed position and elevates the brake shoe 14 into its raised position above rail 18. With the spring compressed and the brake shoe raised, the spring may be caged as described below.

In the earlier embodiment, as spring holder 20 is elevated, caging pin 24 is also elevated so as to raise head 24b on shank 24a into space 28 above the corresponding upper surface of top plate assembly 22. With the springs fully compressed by the actuators, for example given an actuator piston stroke of approximately 10 mm, head 24b will also be elevated by the same stroke into space 28 above the corresponding upper surface of top plate assembly 22. A lock or latch, for example including a latch member such as fork 34 having a thickness substantially equal to the stroke distance is mounted horizontally for lateral sliding translation so as to place the tines 34a of the fork under the annular lip of head 24b of the caging pin. Head 24b may be formed to include an annular lip, rim or collar to engage the fork tines. Fork 34 maybe manually actuated by means of for example a handle or pin 34b. Pin 34b is pushed horizontally to insert fork 34 under head 24b when springs 12 are fully compressed. The insertion of the tines 34b of fork 34 under head 24b cages springs 12 so as to park the brake shoes in a position elevated above rail 18. The brake shoes may then be removed for inspection, maintenance, or replacement. To release the brake shoes from their elevated and parked position, the actuators are fully extended so as to further slightly compress springs 12 to an unlock position, for example a further 2 mm beyond the 10 mm nominal piston stroke, thereby unloading the spring force load from fork 34 by slightly elevating head 24b from fork 34. Fork 34 may then be extracted from underneath head 24b. The actuator pistons may then be retracted to allow springs 12 to extend by the piston stroke distance so as to engage the brake shoe against the rail.

In the above example which is not intended to be limiting, given of a nominal piston stroke distance of 10 mm, once the springs are compressed by the 10 mm stroke distance, a further available compression distance, for example a further 2 mm of compression is available so as to release fork 34 from under head 24b of the caging pin. Also, when the springs are extended the stroke distance of for example 10 mm, the springs should also be capable of a further extension of for example 2 mm so as to accommodate fluctuations in the elevation of rail 18 relative to the elevation of enclosure 26. Thus for example within a range of plus or minus 2 mm the brake shoe should be capable of vertical translation while still maintaining a downward force on the rail sufficient to provide the braking function to inhibit movement of the machine along the rail. To give one example of the force exerted by the springs, which example is not intended to be limiting, each spring may provide a nominal force of 270 kilo-newtons with a maximum force of approximately 300 kilo-newtons. The pair of springs thus provides a nominal 540 kilo-newton force. Thus for the two springs the force required to be exerted upwardly by the two actuators in order to compress the springs is a nominal 540 kilo-newtons and a maximum of approximately 600 kilo-newtons. The full compression of the springs corresponds to the brake released position of the spring assembly where the brake shoe may be elevated 10 mm above the rail and with the spring compressed by the 10 mm piston stroke, that is almost to its maximum, for a spring length of 330 mm.

Figure 9:
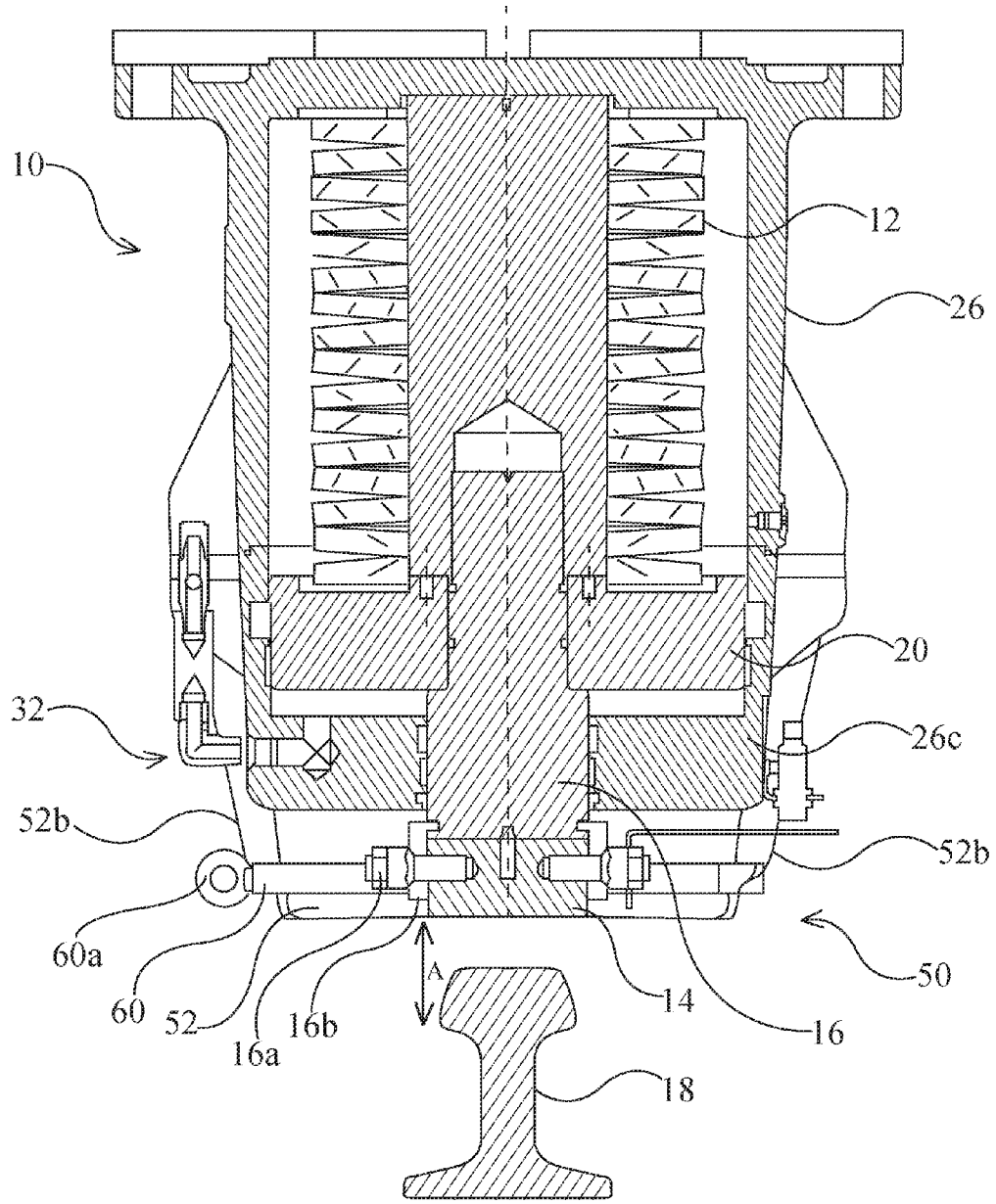

In the present embodiment as seen in FIG. 3 onwards, a caging frame 50 extends downwardly from the bottom end 26c of the rail brake enclosure 26. The caging frame 50 provides a parallel, spaced apart pair of walls 52 depending downwardly from the enclosure so as to define a brake shoe channel 54 therebetween. Walls 52 are supported laterally by opposed pairs of reinforcing members such as flanges 52b. The brake shoe channel 54 is aligned so as to be perpendicular to the rail 18, and positioned so as to center brake shoe 14 over the rail. The brake shoe 14 is mounted to a shoe rod 16 or other supporting structure which in turn is mounted to the bottom of the spring carriage (shown in FIG. 9). The brake shoe 14 is positioned in the brake shoe channel 54 between the parallel pair of walls 52 of the caging frame 50. The brake shoe 14 fits snugly in the channel 54 while remaining free to translate vertically in direction A as seen in FIG. 3. Because of the snug fit of the brake shoe in the brake shoe channel the brake shoe is supported by walls 52 against deflection of the brake shoe due to the brake shoe's engagement on rail 18 resisting movement of the crane along the rail.

A pair of opposed-facing substantially horizontal grooves 56 are formed in and along the interior sides 52a of the pair of walls 52. A corresponding pair of grooves 58 are formed in the sides of the brake shoe 14. When the brake shoe 14 is in its raised position such as seen in FIG. 3, that is, raised above the rail 18, the grooves 58 on the brake shoe 14 align with the grooves 56 in the channel walls 52 of the caging frame 50. With the grooves 56, 58 thus aligned to form key-receiving bores, elongate keys 60, which are sized to snugly fit into the aligned grooves 56, 58 in the manner of a spline joint (where each key 60 acts as the spline in the joint), are slid in direction B into and along the length of the key-receiving bores formed by the aligned grooves 56, 58. At least one key 60, and preferably a pair of keys 60 such as illustrated are employed to lock the brake shoe 14 in its raised position to thereby cage the spring or springs in the rail brake housing. Again, preferably two such keys 60 are used, one on either side of the brake shoe 14. Lifting eye bolts 60a may be provided, mounted to the ends of the keys 60. Keys 60 may be separate rods or may be formed as a unitary tool (not shown), for example shaped as a double-tine or u-shaped fork where the tines (the legs of the u-shape) are the keys.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A spring caging mechanism for a rail brake, wherein the rail brake includes a rail brake enclosure housing at least one spring acting downwardly against a brake shoe mounted underneath the rail brake enclosure so as to urge the brake shoe against a rail when the rail brake is positioned over the rail, the spring caging mechanism comprising:
   a caging frame depending downwardly from the rail brake enclosure so as to bracket the brake shoe which is mounted under the enclosure and linked to the at least one spring in the enclosure, wherein said caging frame includes a pair of substantially parallel walls defining a brake shoe channel therebetween, wherein said channel is sized so that the brake shoe is suspended and snug in said channel for vertical translation of the brake shoe in said channel between raised and lowered positions corresponding to a spring caging position and a rail engaging position respectively,
   wherein opposed facing inner walls of said parallel walls include a corresponding pair of opposed facing first grooves,
   and wherein an oppositely disposed pair of second grooves are formed in oppositely disposed outer surfaces of the brake shoe and positioned so that, when the brake shoe is in said raised position said first and second grooves are adjacent and aligned so as to form, collectively, a pair of key-receiving bores on opposite sides of the brake shoe when in its raised position,
   a pair of elongate keys sized for snug sliding fitment into and along said pair of key-receiving bores, wherein when said keys are journalled in said bores the brake shoe is releasably locked in its raised position thereby caging the at least one spring in the rail brake enclosure.

2. The mechanism of claim 1 wherein said pair of key-receiving bores and said first and second grooves are substantially horizontal.

3. The mechanism of claim 2 wherein said pair of first grooves and said pair of second grooves are each aligned in a corresponding substantially horizontal plane.

4. The mechanism of claim 3 wherein said first and second grooves are formed as corresponding channels so that said bores have a substantially square cross-section.

5. The mechanism of claim 1 wherein said brake shoe channel is aligned so as to be substantially perpendicular to the rail when said rail brake is positioned over the rail.

6. The mechanism of claim 5 wherein said caging frame further comprises oppositely disposed reinforcing members abutting and extending away from said parallel walls.

7. The mechanism of claim 6 wherein said reinforcing members include at least one pair of oppositely disposed flanges mounted to so as to extend between said walls and the rail brake enclosure.

8. The mechanism of claim 1 wherein said pair of elongate keys are a pair of separate linear keys.

* * * * *